United States Patent [19]
Lacoste et al.

[11] Patent Number: 5,332,619
[45] Date of Patent: Jul. 26, 1994

[54] PROCESS FOR ANTI-OXIDATION PROTECTION OF A MATERIAL OF WHICH AT LEAST A SURFACE IS MADE OF A CERAMIC FORMED FROM A SILICON COMPOUND, AND A MATERIAL OBTAINED BY SAID PROCESS

[75] Inventors: Marc Lacoste, Villenave D'Ornon; Michel Laxague, Bordeaux Cauderan; Jacques Thebault, Bordeaux, all of France

[73] Assignee: Societe Europeenne De Propulsion, Suresnes, France

[21] Appl. No.: 838,488

[22] Filed: Feb. 19, 1992

[30] Foreign Application Priority Data

Feb. 21, 1991 [FR] France ............................. 91 02104

[51] Int. Cl.$^5$ .............................................. B32B 7/02
[52] U.S. Cl. .................................... 428/245; 428/246;
428/336; 428/375; 428/389; 428/408; 428/426;
428/432; 428/688; 428/689; 428/698; 428/699;
428/701; 428/702
[58] Field of Search ............... 428/245, 246, 336, 367,
428/368, 408, 426, 432, 688, 689, 698, 699, 701,
702, 387, 389, 704, 375

[56] References Cited

U.S. PATENT DOCUMENTS

| | | | |
|---|---|---|---|
| 4,704,328 | 11/1987 | Imao | 428/701 |
| 4,752,503 | 6/1988 | Thebault | 427/248.1 |
| 4,837,230 | 6/1989 | Chen | 428/389 |
| 4,863,798 | 9/1989 | Arenz | 428/368 |
| 5,026,604 | 6/1991 | Thebault | 428/698 |
| 5,051,300 | 9/1991 | Rousseau | 428/699 |
| 5,134,020 | 7/1992 | Cotteret | 428/698 |

FOREIGN PATENT DOCUMENTS

| | | |
|---|---|---|
| 0133315 | 2/1985 | European Pat. Off. . |
| 0134770 | 3/1985 | European Pat. Off. . |
| 0310043 | 4/1989 | European Pat. Off. . |
| 0359614 | 3/1990 | European Pat. Off. . |
| 967846 | 7/1949 | Fed. Rep. of Germany . |

OTHER PUBLICATIONS

"Ceramic Coatings for Carbon Materials", James E. Sheehan, Jul. 5, 1987, Proceedings of 4th Annual Conf. on Mat. Tech.

"Ceramic Coatings for Carbon Materials", James E. Sheehan, May 5, 1987, Proceedings of the Fourth Annual Conference on Materials Technology, GA Technologies Inc., San Diego, Calif. 92138.

"Active-to-Passive Transition in the Oxidation of Silicon Carbide and Silicon Nitride in Air", Wallace L. Vaughn, J. Am. Ceram. Soc. 7a pp. 1540–1543, Hampton, Va.

Primary Examiner—Ellis P. Robinson
Assistant Examiner—Timothy M. Speer
Attorney, Agent, or Firm—Weingarten, Schurgin, Gagnebin & Hayes

[57] ABSTRACT

Anti-oxidation protection for a silicon compound under both an active oxidation condition and a passive oxidation condition is achieved by forming an intermediate layer devoid of the element silicon between the surface of the silicon compound ceramic, such as SiC, and a silica based vitreous outer layer, such as $SiO_2$, to be subsequently deposited. The intermediate layer is made of alumina ($Al_2O_3$) or an alumina precursor, so as to constitute a reaction barrier between the silicon compound and the silica outer layer on the one hand, and trap any amount of silica that may be formed by an oxidation of the silicon compound.

11 Claims, 3 Drawing Sheets

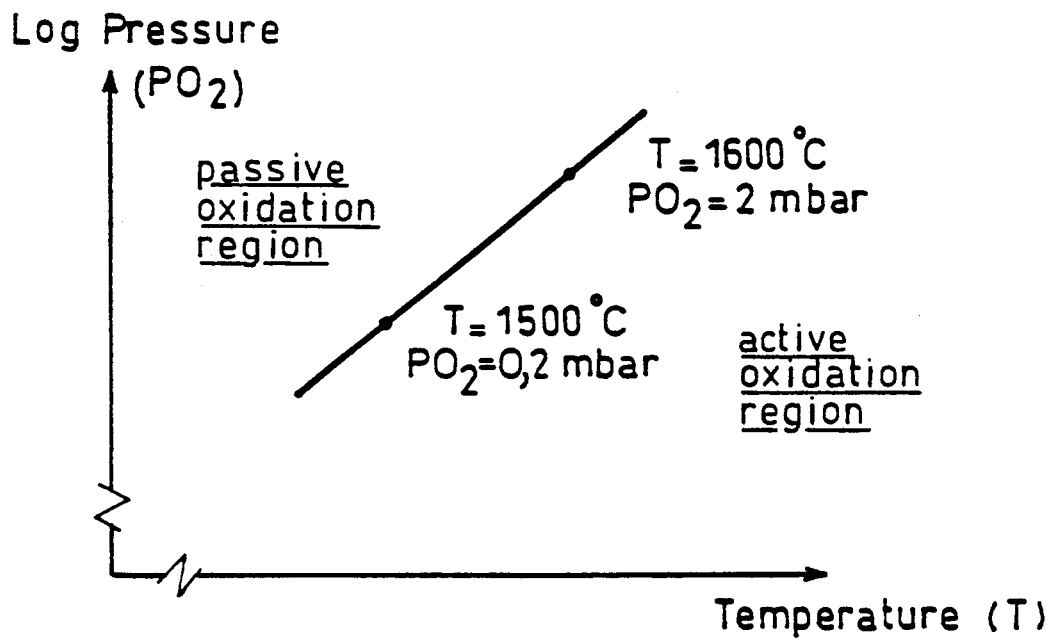
fig_1
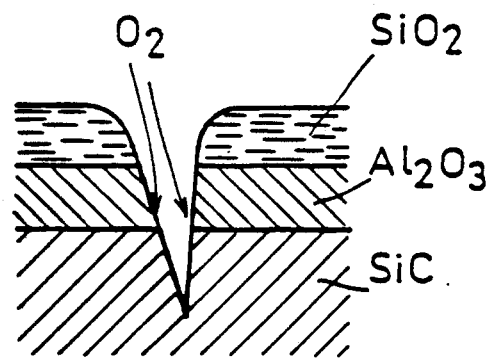
fig_3A
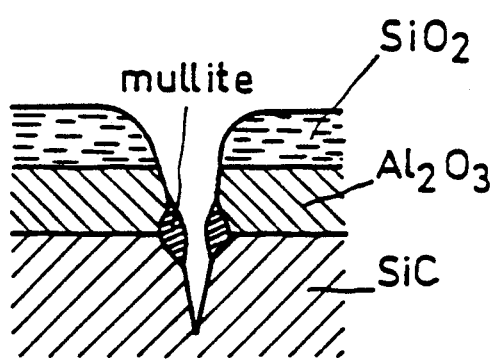
fig_3B
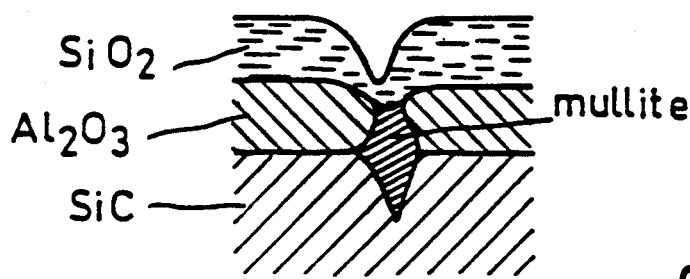
fig_3C

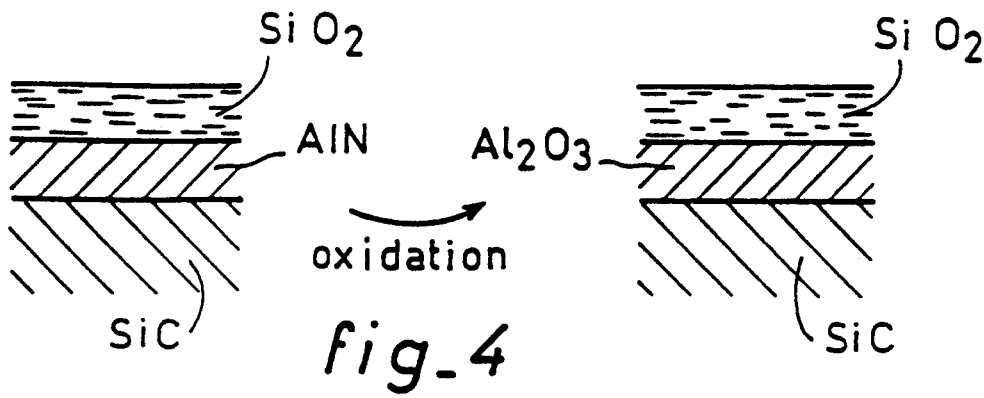
fig_4
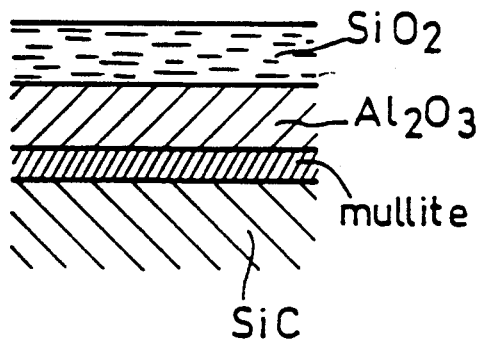
fig_5
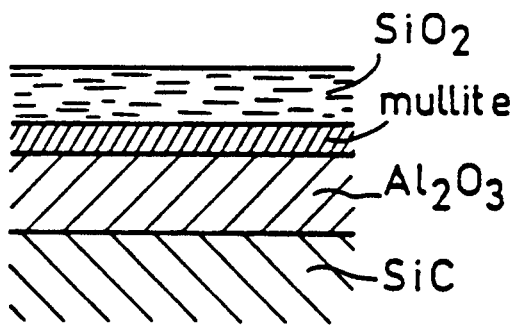
fig_6
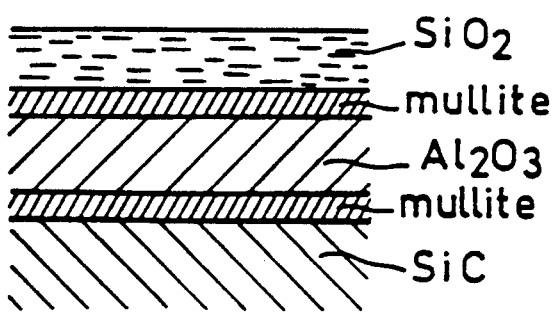
fig_7

PROCESS FOR ANTI-OXIDATION PROTECTION OF A MATERIAL OF WHICH AT LEAST A SURFACE IS MADE OF A CERAMIC FORMED FROM A SILICON COMPOUND, AND A MATERIAL OBTAINED BY SAID PROCESS

BACKGROUND OF THE INVENTION

1. Field of the Invention

The present invention relates to the anti-oxidation protection of a material of which at least a surface is made of a ceramic formed from a silicon compound.

In particular, the present invention is aimed at composite materials, and more particularly thermostructural materials, that contain an oxidizable layer.

Thermostructural composite materials are characterized by good mechanical properties and their ability to retain these properties up to high temperatures. They are made from a refractory fibrous reinforcement that is densified by a matrix that is likewise refractory. The refractory materials making up the fibers and the matrix can be carbon (C) or a ceramic, such as silicon carbide (SiC). The resulting composite materials can be of the following type: C/C, C/SiC (carbon fiber reinforcement and SiC matrix), SiC/SiC, or C/C-SiC (in which the matrix has respective carbon and SiC phases). Their mechanical characteristics can be enhanced by forming a pyrolytic carbon or boron nitride intermediate layer, also known as an interphase, between the fibers and the matrix.

It is essential that these materials be provided with an anti-oxidation protection, otherwise they would rapidly deteriorate when exposed to an oxidizing atmosphere at high temperature.

2. Prior Art

Silicon carbide (SiC) is widely used for forming an anti-oxidation layer. The SiC layer can be obtained by different processes, such as chemical vapor infiltration or deposition, pack cementation, or silicon inducement of a composite material. With composite materials having an SiC matrix, the SiC coating is provided by the outer layer of the matrix.

Usually, the protective action of the SiC coating is completed by an external surface coating. The latter is advantageously made of silica ($SiO_2$) glass that forms a barrier against oxygen diffusion. The coating also possesses healing properties, since it constitutes a vitreous layer whose viscosity is such to fill in any cracks appearing in the SiC coating when the material is at its high service temperature. This vitreous layer thus helps improve the crack resistance of the material protects. The viscosity of this viscous layer can be controlled by the introduction of different additives, e.g. to adapt the viscosity to the temperature range in which the material is to be exposed in use. It should be noted that even in the absence of an external vitreous layer, the passive oxidation of the SiC leads to the formation of an external $SiO_2$ oxide layer.

The anti-oxidation protection afforded by an SiC coating, with or without an $SiO_2$ based vitreous layer, is satisfactory for encountering conditions involving a passive oxidation of the SiC.

However, this is no longer so when active oxidation conditions are encountered, that is at temperature and pressure conditions under which the oxidation causes the formation of volatile species (SiO) that anihilate the protective effect. Indeed, such conditions lead to a deterioration of the SiC coating, which rapidly gives the oxidizing species easy access to the oxidizable layer of the composite material.

The formation of SiO gas can result from a chemical reaction between SiC and an oxidizing species from the environing medium, such as water or oxygen, or from a chemical reaction between SiC and an $SiO_2$ layer.

The transition between passive and active oxidation of SiC occurs at lower temperatures as pressure diminishes. Consequently, active oxidation of SiC can take place under certain conditions of use of the thermostructural materials, for instance when they are employed as heat shielding elements in space vehicles that experience considerable heat upon re-entry into the upper atmosphere.

Several solutions have been put forward to solve the problem caused by active oxidation of SiC at high temperature. In particular, reference can be made to documents EP-0 310 043 and FR-A-2 635 773, as well as a paper entitled "Ceramic Coatings for Carbon Materials" by J. E. Sheehan, published in Proceedings on Material Technology, May 1987.

However, none of these documents discloses the presence of an $SiO_2$ based external vitreous layer-if anything, they advise against it.

The above discussion concerning SiC applies equally to other ceramic materials formed from a silicon compound, and in particular to silicon nitride ($Si_3N_4$). $Si_3N_4$ does indeed have similar characteristics to those of SiC, and is known both as a material susceptible of forming the matrix of a ceramic matrix composite material, and as a material that can constitute an anti-oxidation protective coating. Under passive oxidation conditions, there is formed an $SiO_2$ layer on an $Si_3N_4$, whereas under active oxidation conditions, $Si_3N_4$ reacts in the same way as SiC.

SUMMARY OF THE INVENTION WITH OBJECTS

An object of the present invention is to provide an anti-oxidation protection for a material of which at least a surface is composed of a ceramic formed from a silicon compound, the protection comprising an $SiO_2$ based vitreous outer layer and being effective against both active and passive oxidation conditions for the silicon compound.

This object is achieved by virtue of a process according to which an intermediate layer devoid of the element silicon is formed between the surface of the silicon compound and the silica based outer layer, the intermediate layer being made of alumina or an alumina precursor.

The term alumina precursor is understood to mean an aluminum compound, such as aluminum nitride (AlN), that generates alumina upon oxidation.

The intermediate layer prevents any contact, and hence any possibility of reaction, between the ceramic formed by the silicon compound and the $SiO_2$ based outer layer, while being compatible with the silicon compound and $SiO_2$. Accordingly, all the advantages of the $SiO_2$ based vitreous layer will be retained under active oxidation conditions, in addition to those it is known to offer under passive oxidation conditions.

If a crack reaches the silicon compound from the external surface of the material, then the silicon compound could become oxidized with the resulting formation of either SiO, if the conditions correspond to an active oxidation, or else $SiO_2$, if the conditions correspond to a passive oxidation. In both cases, the oxide produced will combine with the alumina to yield mullite. This gives rise to a growth in volume on account of a crystal rearrangement, and hence to a closing of the crack. More particularly, in the case where $SiO_2$ is formed by oxidation of a silicon compound, its combination with the alumina in yielding a mullite layer will cause it to lose all its reactivity with regard to the silicon compound. It can thus be seen that the alumina of the intermediate layer serves not only to set up a reaction barrier between the ceramic formed by the silicon compound and the external $SiO_2$ based external layer, but also to trap the $SiO_2$ formed by oxidation of the silicon compound.

A mullite layer can also be created by the interaction between the external $SiO_2$ based external layer and the alumina of the intermediate layer.

Another aspect of the present invention concerns a material provided with anti-oxidation protection obtained by means of the aforementioned process, and in particular a thermostructural composite material.

BRIEF DESCRIPTION OF THE DRAWINGS

The present invention shall be more clearly understood upon reading the following non-limiting description with reference to the appended drawings in which:

FIG. 1 is a diagram illustrating the transition between the passive and active oxidation modes for SiC, FIGS. 3A to 3C are very schematic illustrations of the protection mechanism operative on cracks at the surface of a material provided with an anti-oxidation protection according to the present invention, and FIGS. 4 to 7 are very schematic illustrations of different configurations providing anti-oxidation protection according to the present invention.

DETAILED DESCRIPTION OF THE PREFERRED EMBODIMENTS

Figure 2:
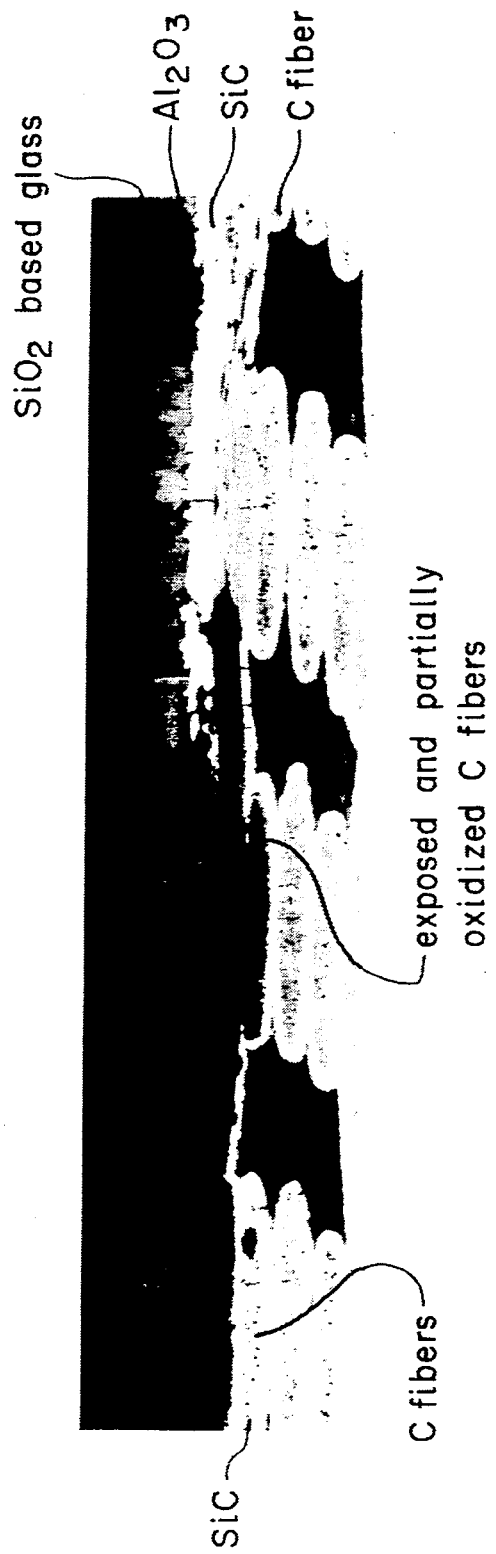
FIG. 2 is a photomicrograph showing a cross-section through a surface portion of a C/SiC composite material sample, after an oxidation treatment, where the sample is provided partly with an anti-oxidation protection according to the prior art and partly with an anti-oxidation protection according to the present invention.

The field of the invention covers the anti-oxidation protection of materials where at least the surface is made of a ceramic formed from a silicon compound.

By way of example, there shall now be considered a thermostructural material of C/SiC type, i.e. a material having a carbon fiber reinforcement and an SiC matrix. In this case, the SiC surface is constituted by the outer layer of the SiC matrix.

A number of samples are prepared as follows:
- a carbon fiber substrate is produced by superposing flat plies made of carbon cloth, so as to obtain a preform having a fiber volume ratio of 40% (that is the percentage of the preform's apparent volume effectively occupied by the fibers),
- an intermediate pyrolytic carbon coating is formed on the fibers by chemical vapor infiltration, the thickness of the coating being on the order of 0.4 mils (1 micron), and
- SiC is infiltrated into the heart of the preform by chemical vapor infiltration until a residual porosity of 9% was reached; SiC is also deposited on the surface of the sample during this operation.

The above type of process is described in U.S. Pat. No. 4,752,503.

In an oxidizing atmosphere, a protective $SiO_2$ coating is formed through a surface oxidation of the SiC material. The combination of SiC and $SiO_2$ serves as an anti-oxidation protection when the SiC is subjected to passive oxidation conditions.

Some of the C/SiC material samples were submitted to oxidation in air at various temperatures and pressures, in order to determine the transition point between the passive and active oxidation conditions for SiC. In this case, the active oxidation condition was signalled by the detection of a loss of weight of the material due to the creation of SiO gas.

This transition is shown in the diagram of FIG. 1, where the temperature is given by the abcissa and the partial oxygen pressure is given on a logarithmic scale by the ordinate. The passage from the passive oxidation region to the active oxidation region was detected at around 1600° C. for a partial oxygen pressure lowered to around 2 mbar (200 Pa), and at around 1500° C. for a partial oxygen pressure lowered to around 0.2 mbar (20 Pa). It should be noted that the transition conditions between the passive and active regions are as a rule relatively imprecise, as can be understood from the paper entitled "Active to passive transition in the oxidation of silicon carbide and silicon nitride in air" by Wallace L. Vaugh, published in Journal of the American Ceramic Society, 73(6) pp 1540–1543 (1990).

EXAMPLE

According to one exemplary implementation of the present invention, samples of C/SiC material obtained as per the aforementioned process are provided with a layer of alumina ($Al_2O_3$) and a silica ($SiO_2$) based vitreous outer layer.

The intermediate $Al_2O_3$ layer is deposited by plasma sputtering. Its thickness is on the order of 40 mils (100 microns).

The external $SiO_2$ based layer is applied with a brush or spray gun and subsequently heat treated to create a vitreous layer. The thickness of this $SiO_2$ based vitreous layer is on the order of 20 mils (50 microns).

The $Al_2O_3$ layer can be formed by other processes, such as chemical vapor deposition. Similarly, the $SiO_2$ based layer can be formed by a sol-gel process, or any other process yielding glass in the form of a thin film.

Samples of C/SiC material thus provided with an intermediate $Al_2O_3$ coating and an $SiO_2$ based vitreous outer layer are respectively submitted to one of the following treatments:

1) oxidation treatment in air at 1600° C. under a pressure of 1 mbar (0.1 KPa), corresponding to a partial oxygen pressure of 0.2 mbar, for nine periods of 20 mins (with return to ambient temperature between each heating cycle), resulting in a mass loss of 1.6%, 2) oxidation treatment in atomic oxygen at 1870° C. under a total air pressure of 45 mbar (4.5 KPa, equivalent to a partial oxygen pressure of 9 mbar, i.e. 0.9 KPa) for a period of five mins, resulting in a mass loss of 0.15%, 3) oxidation treatment in air at 1500° C. under an air pressure of 1 bar ($10^2$KPa) for nine hours, divided into six periods of 90 mins (with return to ambient temperature after each heating cycle), leading to a mass loss of 0.75%.

In all of the above cases, no active oxidation of SiC is observed.

COMPARATIVE TEST 1

For comparison, C/SiC samples devoid of $Al_2O_3$ and $SiO_2$ layers are submitted to the above-mentioned oxidation tests (1), (2) and (3). After treatment (1), a corrosive attack of the SiC can be observed, with exposure of the carbon fibers, leading to a rapid destruction of the material. The mass loss after only seven 20 min periods of treatment is 18%.

After treatment (2), a corrosive attack of the SiC can be observed as in the previous example, with exposure of the carbon fibers, leading to a rapid destruction of the material. The mass loss is 2.5%.

These two examples illustrate the effectiveness of the inventive coating for anti-oxidation protection under active oxidation conditions of SiC.

After treatment (3), no oxidation is observed, indicating that the parameters were in fact within the passive oxidation conditions of SiC. The mass loss is 17%, confirming the effectiveness of the coating provided in accordance with the invention in the protection against oxidation under passive oxidation conditions of SiC.

COMPARATIVE TEST 2

A C/SiC sample is coated with an $SiO_2$ based glass layer according to the prior art, and submitted to oxidation treatment (2) described above. After treatment, a corrosive attack of SiC is observed, with exposure of the carbon fibers, leading to a rapid destruction of the material. The mass loss is 4.7%, underscoring the inefficiency of this type of protection under active oxidation conditions of SiC.

COMPARATIVE TEST 3

A C/SiC sample is coated in part with an $Al_2O_3$ layer by means of plasma sputtering up to a thickness of about 40 mils (100 microns), the surface of another part of the sample being masked. After withdrawal of the mask, an outer vitreous layer having a thickness of about 20 mils (50 microns) is formed by spraying and thermal treatment.

The thus-coated sample is submitted to oxidation treatment (1) described above. FIG. 2 is a photomicrograph showing a cross-section through a portion of the sample's surface.

The right side of FIG. 2 corresponds to the part of the sample where the $Al_2O_3$ intermediate layer was formed. It reveals that the SiC coating constituted by the external layer of the matrix was not subjected to corrosive attack and remained protected by the $Al_2O_3$ and the $SiO_2$ based glass layer.

In contrast, the left side of FIG. 2, which corresponds the portion of the sample where the $Al_2O_3$ intermediate layer was not formed, indicates the disappearance of the SiC coating constituted by the external layer of the matrix, together with the $SiO_2$ based glass layer, causing the exposure and corrosive attack of the carbon fibers.

FIG. 2 is thus a spectacular illustration of the efficiency of the protection according to the invention under active oxidation conditions.

It can be noted that with the process according to the invention, the anti-oxidation protection is effective in spite of a superficial cracking of the coating, such cracking being bound to occur at least in the heat cycles of treatment (1) explained above.

This can be explained as follows:

When there occurs a crack at the surface of the material down to the SiC layer (FIG. 3A), the $SiO_2$ of the external layer, due to the viscosity of that layer, and/or oxidizing species of the environing medium come into contact with the SiC. In the latter case, there is formed $SiO_2$ or SiO, depending on whether the conditions respectively correspond to passive or active oxidations.

In all cases, alumina is largely in excess relative to the $SiO_2$ or SiO, and mullite is formed in proportion to the quantity of $SiO_2$ or SiO present (FIG. 3B).

Consequently, there occurs a growth in volume due to the resultant crystal rearrangement, and hence a closing of the cracks (FIG. 3C), while the $SiO_2$ that combines with the alumina loses all of its reactivity with respect to SiC. The reaction between the $SiO_2$ outer coating and the SiC is thus inhibited by the presence of mullite.

The foregoing example involved the formation of an intermediate alumina layer between the SiC and the $SiO_2$ based outer coating.

Alternatively, as shown in FIG. 4, the intermediate layer can be composed of any aluminum compound or mixture that is a precursor to alumina. Among such precursor materials are aluminum nitride, aluminum oxi-nitride or aluminum carbide (AlN, AlNON, $Al_4C_3$), which yield alumina by oxidation. For example, the intermediate layer can be formed from aluminum nitride (AlN) obtained by chemical vapor deposition.

As explained earlier, mullite may be formed at the interface between the SiC and the $Al_2O_3$ layer by a chemical reaction between the $Al_2O_3$ and the $SiO_2$ produced by oxidation of the SiC. Mullite can also be formed at the interface between the $Al_2O_3$ layer and the $SiO_2$ outer coating.

Accordingly, it could be advantageous to deliberately form a mullite interphase between the SiC and the $Al_2O_3$ (or $Al_2O_3$ precursor) intermediate layer (FIG. 5), or between that layer and the $SiO_2$ based vitreous outer layer (FIG. 6), or again on either side of the intermediate layer (FIG. 7).

The mullite interphase can be deposited by plasma sputtering. As an approximate indication, the thickness of the mullite interphase can be on the order of 12 mils (30 microns).

Thus, in the above implementation, the principal characteristic of the invention is the formation of an intermediate layer that is devoid of silicon and essentially made of alumina, or an alumina precursor, between the silicon carbide layer and the silica based vitreous outer coating.

The intermediate layer sets up a reaction barrier between the silica in the external layer and the silicon carbide. It also forms a trap for the silica created by oxidation of the silicon carbide when cracks enable the oxidizing species of the environment to have access to the silicon carbide. Thus, quite unexpectedly, the intermediate layer conserves the advantages of the silica based vitreous outer coating in active oxidation conditions of silica carbide, even when cracks are present.

Advantageously, the thickness of the alumina or alumina precursor layer is at least 8 mils (20 microns).

In a further embodiment, the silica-based vitreous outer layer has a thickness of at least 20 mils (50 microns).

Different dopants or additives may be added to the silica based outer layer so as to modify its properties, such as its emissivity or viscosity at high temperature.

In particular, metal oxide additives can be used to controllably adapt the viscosity to the material's service temperatures, so that the vitreous outer layer can offer an optimal healing of cracks at these temperatures.

Although the foregoing description concerned anti-oxidation protection of a C/SiC type of thermostructural material, the present invention can also apply to other thermostructural composite materials that contain an oxidizable phase. Among the latter are the mixed-matrix type composite materials, e.g. with a C-SiC (carbon and silicon carbide) matrix, in which the SiC surface is constituted by the external SiC layer of the matrix, or carbon matrix materials (e.g. of the C/C type) having an SiC surface coating obtained by chemical infiltration or deposition or by pack-cementation, or ceramic/ceramic materials having a pyrolytic carbon or boron nitride interphase between the ceramic fibers and the ceramic matrix, these materials having an SiC matrix or being provided with an SiC surface coating.

The present invention also finds applications in instances where the silicon carbide for the matrix is replaced by another ceramic made of a silicon compound prone to deterioration by active oxidation, such as silicon nitride.

More generally, the invention can be used for anti-oxidation protection of any material of which at least the surface is constituted by a ceramic made from a silicon compound, especially when the material is liable to encounter conditions under which there might occur an active oxidation of the silicon compound.

What is claimed is:

1. A material which is protected against oxidation having at least a layer which is composed of a ceramic made from a silicon compound, wherein said material comprises:

an intermediate layer formed over said layer composed of a ceramic made from a silicon compound, and a silica-based vitreous outer layer formed over said intermediate layer, wherein said intermediate layer is made of alumina or an alumina precursor and is free of the element silicon so as to constitute a reaction barrier between said silicon compound and said silica-based vitreous outer layer, and to trap silica that may be formed by an oxidation of said silicon compound, whereby anti-oxidation protection is achieved under both an active oxidation condition of said silicon compound and a passive oxidation condition of said silicon compound.

2. The material of claim 1, wherein said intermediate layer has a thickness of at least 20 microns.

3. The material of claim 1, wherein said silica-based outer layer has a thickness of at least 50 microns.

4. The material of claim 1, wherein said material further comprises a mullite interphase between said silicon layer and said intermediate layer.

5. The material of claim 1, wherein said material further comprises a mullite interphase between said intermediate layer and said silica-based vitreous outer layer.

6. The material of claim 1, wherein said material constitutes a thermostructural composite material comprising a densified refractory fibrous matrix that is comprised a silicon compound, said silicon compound layer being constituted by an external portion of said matrix.

7. The material of claim 6, wherein at least one constituent element among said fibrous matrix is comprised of carbon.

8. The material of claim 6, wherein said material further comprises an oxidizable interphase made of a material chosen among pyrolytic carbon and boron nitride between the fibers of said fibrous matrix.

9. The material of claim 1, wherein said material constitutes a thermostructural composite material comprising a densified refractory fibrous matrix, said silicon compound layer being a coating formed over said matrix.

10. The material of claim 9, wherein said material further comprises an oxidizable interphase made of a material chosen among pyrolytic carbon and boron nitride between fibers of said fibrous matrix.

11. The material of claim 1, wherein said ceramic made of a silicon compound is chose among silicon carbide and silicon nitride.

* * * * *

UNITED STATES PATENT AND TRADEMARK OFFICE
CERTIFICATE OF CORRECTION

PATENT NO. : 5,332,619
DATED : July 26, 1994
INVENTOR(S) : Marc Lacoste, et al.

It is certified that error appears in the above-indentified patent and that said Letters Patent is hereby corrected as shown below:

Column 1, line 48, "such to" should read --such as to--.

Column 8, line 21, "comprised a silicon" should read --comprised of a silicon--.

Signed and Sealed this

Twenty-eight Day of February, 1995

Attest:

BRUCE LEHMAN

*Attesting Officer*   *Commissioner of Patents and Trademarks*